United States Patent [19]

Shirotori

[11] Patent Number: 5,686,803
[45] Date of Patent: Nov. 11, 1997

[54] CONTROL APPARATUS FOR A PULSE MOTOR

[75] Inventor: Hiroshi Shirotori, Nagano, Japan

[73] Assignee: Seiko Epson Corporation, Tokyo, Japan

[21] Appl. No.: 549,523

[22] Filed: Oct. 27, 1995

[30] Foreign Application Priority Data

Oct. 28, 1994 [JP] Japan .................. 6-265071

[51] Int. Cl.$^6$ .................. H02K 29/02; B41J 21/17
[52] U.S. Cl. .................. 318/567; 318/685; 318/696; 400/279
[58] Field of Search .................. 318/560–680, 318/268, 434, 464, 696, 801, 807, 85, 685; 355/235, 233, 236, 61; 388/903, 909, 813; 400/279, 903, 322; 360/78.07, 78.06, 78.04; 364/565, 571.01; 346/1.1, 139 R, 140 R

[56] References Cited

U.S. PATENT DOCUMENTS

| | | | |
|---|---|---|---|
| 4,340,848 | 7/1982 | Hanagata et al. | 318/561 |
| 4,459,527 | 7/1984 | Hayman | 318/696 |
| 4,691,154 | 9/1987 | Sato et al. | 318/696 |
| 4,777,609 | 10/1988 | Cavill et al. | 364/519 |
| 4,810,941 | 3/1989 | Ohisi et al. | 318/314 |
| 5,189,436 | 2/1993 | Yoshikawa | 346/1.1 |
| 5,229,670 | 7/1993 | Kagawa | 310/12 |
| 5,258,773 | 11/1993 | Arakawa et al. | 346/1.1 |
| 5,291,114 | 3/1994 | Shirotori et al. | 318/685 |
| 5,335,189 | 8/1994 | Takayama et al. | 364/565 |
| 5,345,348 | 9/1994 | Suzuki | 360/78.07 |
| 5,402,054 | 3/1995 | Eckersley | 318/801 |
| 5,547,295 | 8/1996 | Kanemitsu | 400/279 |

OTHER PUBLICATIONS

Patent Abstracts Of Japan, unexamined applications, E field, vol. 12, No. 318, Aug. 29, 1988 The Patent Office Japanese Government p. 33 E 650; & JP-A-63 080 798 (FUJI) *Abstract.

Patent Abstracts Of Japan, unexamined applications, E field, vol. 11, No. 36, Feb. 3, 1987 The patent Office Japanese Government p. 93 E 477; & JP-A-61 203 898 (CANON) *Abstract.

*Primary Examiner*—Paul Ip
*Attorney, Agent, or Firm*—Sughrue,Mion,Zinn,Macpeak & Seas, PLLC

[57] ABSTRACT

In a control apparatus for a pulse motor, both a smooth acceleration property and a stable constant speed operation characteristic are realized in a process wherein the motor starts to run and then is accelerated to enter a constant speed operating state. A target value for the rotor phase, and motor speeds at N different phase switching times during an acceleration period of the pulse motor are determined in advance. Then, phase control values (for conducting respective phase switchings when the rotor phase reaches the target phase of each phase switching) and speed control values (for conducting respective phase switchings so that the motor speed at each phase switching further approaches a target speed) are integrated with each other in accordance with a predetermined weighting function, and then executed. In an early stage of acceleration, the weight of the phase control predominates. As the motor speed increases, the speed control is weighted more and more heavily relative to the phase control. When the motor speed reaches the target speed for constant speed operation in a final stage of acceleration, only the phase control is once more conducted exclusively and only once, so that the rotor phase at a phase switching time is merged into the target phase switching phase, thereby achieving constant speed operation.

12 Claims, 5 Drawing Sheets

CONTROL APPARATUS FOR A PULSE MOTOR

BACKGROUND OF THE INVENTION

1. Field of the Invention

The invention relates to control apparatus for a pulse motor, and particularly to improvements in controlling a process wherein the motor starts to run and then is accelerated to enter a constant speed operational state.

2. Background Discussion

In a printer, a pulse motor excellent in controllability is preferably used as a carriage motor, a sheet feeding motor, or the like. Pulse motors provided for such purposes must be controlled in such a manner that the motor is smoothly accelerated to rapidly enter a constant speed operation state, thereby attaining a stable constant speed operation. In order to prevent synchronization from being lost during operation, the rotor phase θ with respect to the magnetic field is required to be in a range wherein a suitable torque is always obtained (for example, −45 deg. to −135 deg. (electrical angle)).

To comply with such requirements, conventionally, the pulse motor is controlled in the following manner. The position of the rotor is measured by a rotary encoder. Then the timing for switching the phase is adjusted so that the pulse output of the rotary encoder leads or lags a phase switching timing which is previously stored in a ROM. Specifically, when the pulse output timing of the encoder leads the phase switching timing, the phase of the pulse motor is switched at the timing programmed in the ROM, and, when the pulse output timing of the encoder lags the phase switching timing, the phase switching is conducted in accordance with the pulse output timing of the encoder.

In this way, in the control of the prior art, the timing for switching the phase is adjusted based only on the speed of the motor.

The prior art has a problem in that, even when the motor speed has already reached the target speed, so-called dumping, or fluctuation of the speed occurs, and hence it is difficult to conduct stable constant speed operation. This problem arises for the following reason. Since a motor is controlled based only on the speed of the motor, the phase θ at a phase switching time does not always have an appropriate value even when the motor speed reaches the target speed for constant speed operation. When the phase θ at a phase switching time fails to have an appropriate value, a suitable torque cannot be obtained, so that the actual speed is not stabilized at the target speed, and fluctuates instead.

SUMMARY OF THE INVENTION

Consequently, it is an object of the invention to provide a control apparatus for a pulse motor which produces both a smooth acceleration property and a stable constant speed operation property in a process wherein the motor starts to run and then is accelerated to enter a constant speed operational state.

The control apparatus according to a first aspect of the invention includes: acceleration controlling means for controlling the pulse motor to accelerate the pulse motor to a target speed for constant speed operation; and phase adjusting means for adjusting, in a final stage of a control conducted by the acceleration controlling means, a phase of the pulse motor at a phase switching time so as to coincide with a target phase switching phase for constant speed operation.

The control apparatus according to a second aspect of the invention has an the acceleration controlling means that includes: means for generating, in an acceleration control period, a speed control operation amount for the purpose of rendering an actual speed of the pulse motor coincident with a target speed for the acceleration period; means for generating a phase control operation amount for the purpose of rendering the phase at a phase switching time coincident with a target phase switching phase for the acceleration period; and means for integrating the speed control operation amount with the phase control operation amount in accordance with predetermined weighting, thereby obtaining an integrated operation amount for actually controlling the pulse motor, the weighting being set so that, in an early portion of the acceleration period, a relatively large weight is given the phase control operation amount, and, in a latter portion of the acceleration period, a relatively large weight is given the speed control operation amount.

In the control apparatus according to the first aspect of the invention, when the acceleration control reaches the final stage, or the actual speed of a motor substantially reaches the target speed of constant speed operation, the phase of the motor at a phase switching time is adjusted so as to coincide with the target phase switching phase for constant speed operation. As a result, the phase at a phase switching time becomes appropriate for constant speed operation in succeeding constant speed operation. Unlike the prior art, therefore, dumping does not occur.

In the control apparatus according to the second aspect, during an acceleration period, the speed control for rendering the actual speed of a motor coincident with the target speed, and the phase control for rendering the phase at a phase switching time coincident with a target phase switching phase are integrated with each other in accordance with predetermined weighting, and then executed. Namely, the acceleration control is conducted so that, earlier in the acceleration period, the weight of the phase control predominates, and, later in the acceleration period, the weight of the speed control predominates.

As a result, in an early stage of acceleration, effectively the phase control controls acceleration; and hence a torque required for acceleration can surely be obtained so that smooth acceleration is realized. In a latter stage of acceleration, primarily the speed control controls acceleration. In the final stage of acceleration, therefore, the speed of the motor can accurately reach the target speed for constant speed operation. Furthermore, once the motor enters the constant speed operating state, a stable constant speed which is free from dumping can be attained. Thus, the control apparatus according to the second aspect shares this particular advantage with the control apparatus according to the first aspect.

DETAILED DESCRIPTION OF THE PREFERRED EMBODIMENTS

Figure 1:
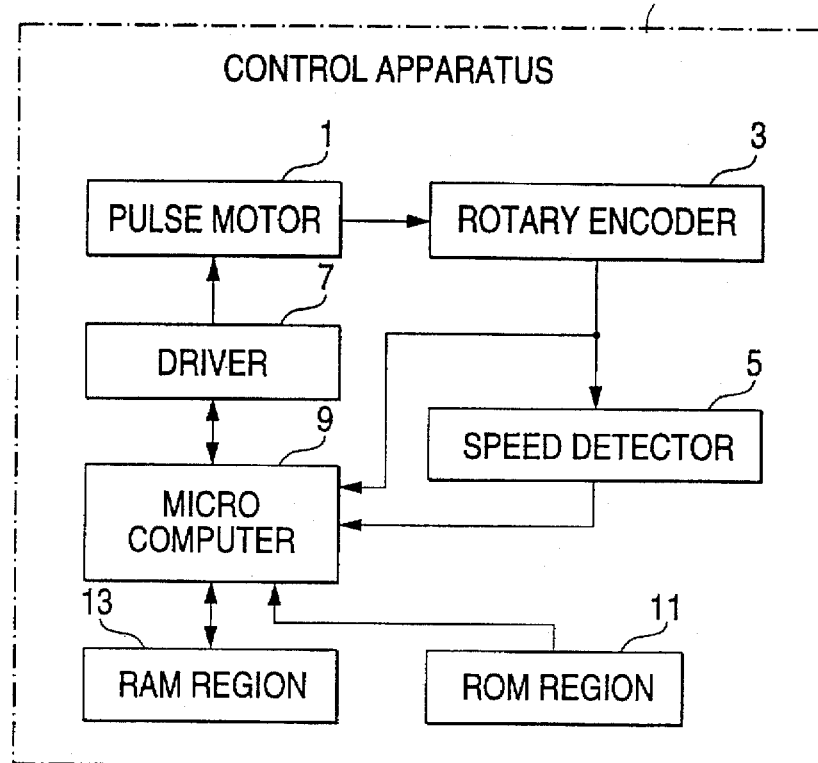
FIG. 1 is a block diagram showing the configuration of an embodiment of the control apparatus of the invention.

FIG. 1 shows the configuration of an embodiment of a control apparatus 10 according to the invention, which can be applied to, for example, the control of a carriage motor of a serial printer.

The control apparatus 10 of FIG. 1 has a rotary encoder 3 coupled to the rotor of a pulse motor 1, which is used as the carriage motor. The apparatus 10 further includes a speed detector 5 which receives an output pulse of the rotary encoder 3, to detect the rotational speed of the rotor. A driver 7 in the apparatus 10 drives the pulse motor 1 while a microcomputer 9 receives outputs of the rotary encoder 3 and the speed detector 5, for controlling the phase switching operation of the driver 7. The microcomputer 9 is supported by a ROM region 11, in which a target speed table, to be described later, is programmed and by a RAM region 13, which stores a target phase switching phase table, also described later.

Figure 2:
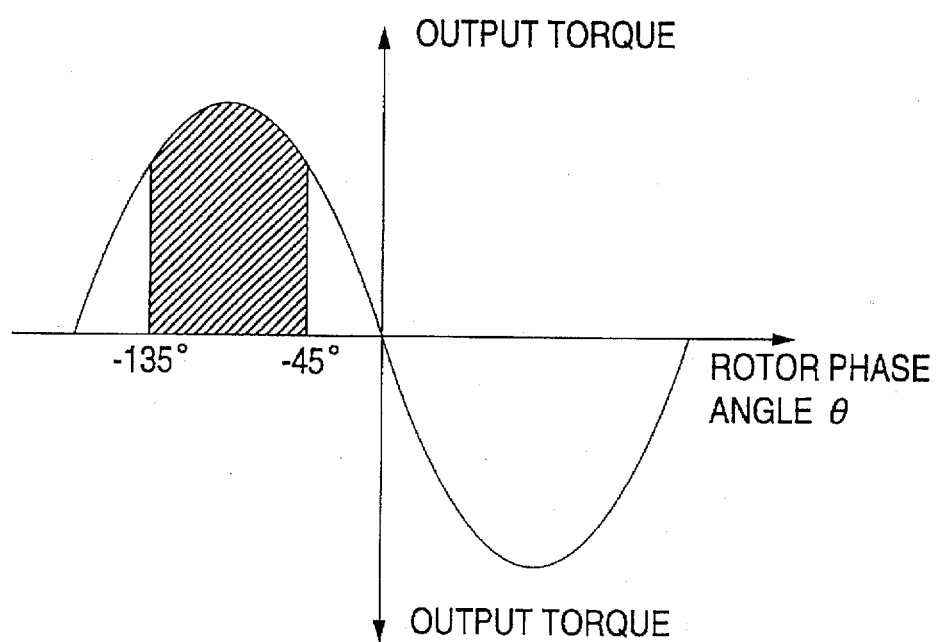
FIG. 2 is a diagram showing the phase-torque characteristics of a pulse motor.

Preferably, the pulse motor 1 is driven by the 2-2-phase magnetization method while being supplied with a constant excitation current. Under this driving method, the relationship between the rotor phase $\theta$ (electrical angle) with respect to the magnetic field and the output torque is as shown in FIG. 2. In the phase-torque characteristics shown, the highest efficiency is attained when the motor is operated such that the phase $\theta$ is set in the range of $-45$ deg. to $-135$ deg. According to the embodiment, however, the motor may be used in a range deviating from the above-mentioned range in consideration of load fluctuation, etc.

Figure 3:
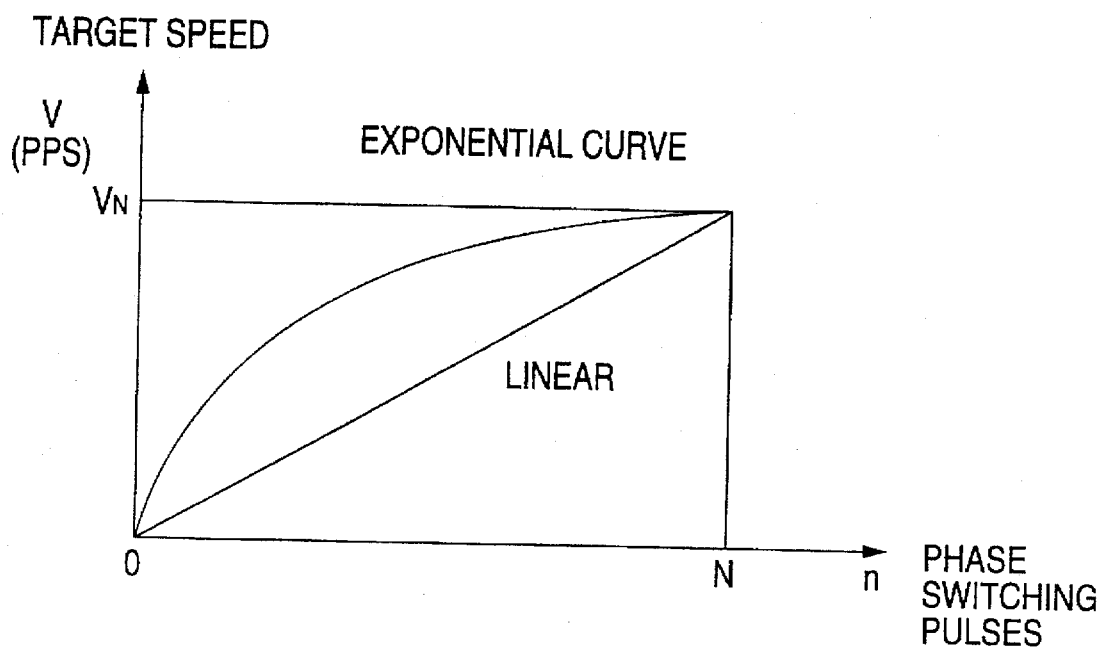
FIG. 3 is a diagram showing a target speed table used in an embodiment of the invention.

The target speed table programmed in the ROM region 11 is set so that, with respect to N phase switching pulses to be output during the acceleration period, the target speed V of the motor at the time of outputting each pulse (phase switching time) is uniquely defined. An illustration of the relationship between these two parameters is shown in FIG. 3. The target speed V at each phase switching time is determined so that, as seen from FIG. 3, the speed smoothly increases either in a linear manner or along a continuous curve (for example, an exponential curve) from the speed V=0 at the start of operation until reaching the target speed $V=V_N$. at the time when the motor enters the constant speed operational state (i.e., when the pulse number n=N).

Figure 4:
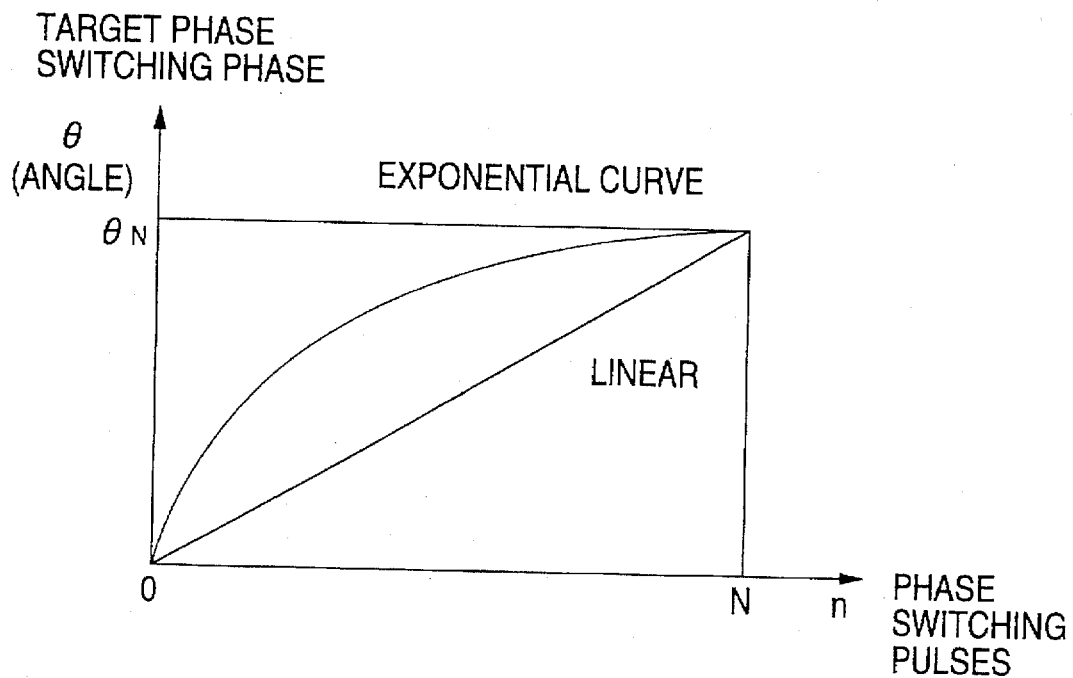
FIG. 4 is a diagram showing a target phase switching phase table used in an embodiment of the invention.

As illustrated by way of example in FIG. 4, the target phase switching phase table stored in the RAM region 13 is set so that, for N phase switching pulses during the acceleration period, the target phase switching phase $\theta$ (electrical angle) is defined with respect to the magnetic field of the rotor at each output time. The target phase switching phase $\theta$ at each phase switching time is determined so that, as seen from FIG. 4, the phase smoothly changes either in a linear manner or along a continuous curve (for example, an exponential curve) from the target phase switching phase of $\theta=0$ deg. at the start of operation until reaching the target phase switching phase $\theta=\theta_N$ when the motor enters the constant speed operation state (n=N). The target phase switching phase $\theta$ is changed smoothly because the speed must increase smoothly.

The target phase switching phase table (FIG. 4) in the RAM region 13 is prepared when the printer is powered on, in the following manner. A preoperation is first performed before the printer enters the real operation state, as described later. The phase switching phase at constant speed operation is measured, and the measured value is set as the target phase switching phase $\theta_N$ at constant speed operation. Then, the target phase switching phase table is calculated so as to interpolate between the target phase switching phase $\theta_N$ and the switching phase of 0 deg. at the start of operation. The calculated target phase switching phase table is then stored in the RAM region 13.

The target phase switching phase at the start of operation is set to be 0 deg. for the following reason. As shown in the phase-torque characteristic diagram of FIG. 2, the phase $\theta$ has an ideal range of $-45$ deg. to $-135$ deg. When each phase switching is conducted at $\theta=-45$ deg., therefore, the motor can theoretically be operated at the highest efficiency. However, the phase switching at $\theta=-45$ deg. causes the phase $\theta$ to be $-135$ deg. immediately after the switching operation. In the case where the load increases for any reason, therefore, the phase may further lag so that the torque is reduced. This can, in the worst case, result in loss of synchronization. To avoid this, for cases where a system having a large load is to be started, a countermeasure can be taken in which the phase $\theta$ immediately after the phase switching operation is in the vicinity of $-90$ deg. At $-90$ deg. the maximum torque is obtained, thereby preventing synchronization from being lost, even when the load fluctuates somewhat. In order to make use of this countermeasure, the initial target phase switching phase $\theta$ is set to be 0 deg. As apparent from the above discussion, however, it is not always necessary to set the initial target phase switching phase $\theta$ to be 0 deg.; alternatively the phase may be set to some other appropriate angle, for example, an angle that leads $-45$ deg.

Figure 5:
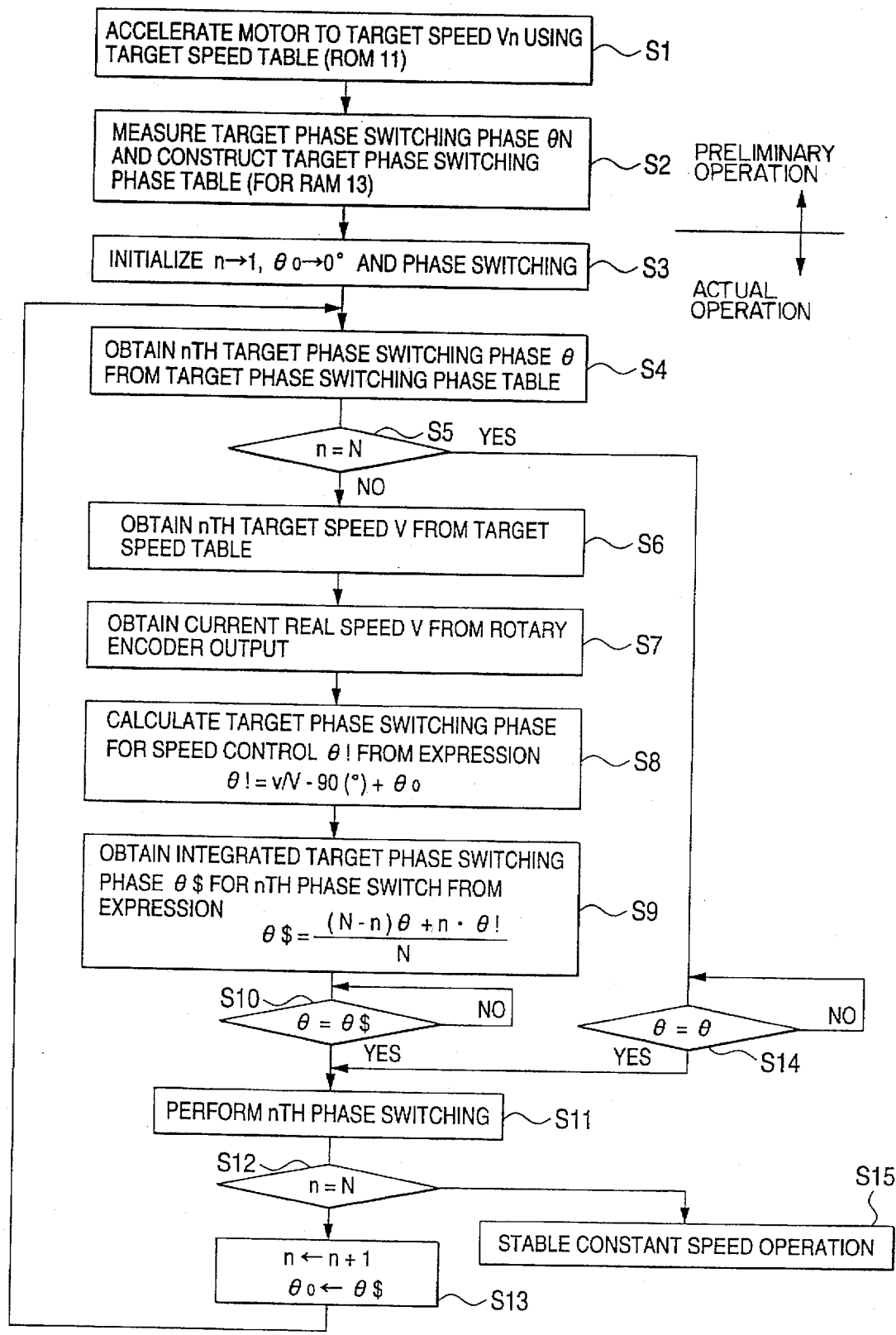
FIG. 5 is a flowchart showing a process flow of an acceleration control according to one embodiment of the invention.

FIG. 5 is a flowchart of the motor control processing which is conducted by the microcomputer 9 in such a configuration. The control has a feature that the phase control for making the phase $\theta$ at a phase switching time coincident with the target phase switching phase $\theta$ is harmonically combined with the speed control for making the speed v coincident with the target speed V. Specifically, the controls are weighted in the following manner: a larger weight is applied to the phase control in the early stages of the starting operation. Gradually, the weight of the speed control is increased as the speed increases, such that the effect of the phase control diminishes. When the speed reaches the target speed for constant speed operation, the contribution of phase control is nearly or completely absent. Finally, at this point, phase control is conducted one more time so that the phase $\theta$ at a phase switching time is merged into the target phase switching phase $\theta_N$ at constant speed running. This can produce smooth acceleration and stable constant speed running properties as described below in greater detail, with reference to FIG. 5.

When the printer is powered on, a preoperation is first performed in order to prepare the target phase switching phase table. In accordance with the target speed table in the ROM region 11, the motor 1 is accelerated to reach the target speed $V_N$ of constant speed operation (step S1). When the motor speed v is stabilized in the constant speed running state, the phase at a phase switching time in this condition is measured. The measured phase is set as the target phase switching phase $\theta_N$ at constant speed operation. Then, interpolation is performed so that the phase will change smoothly from the switching phase of 0 deg. at the start to the target phase switching phase $\theta_N$ at constant speed operation, and a target phase switching phase table such as that shown by one of the curves in FIG. 4 is constructed (step S2). The preoperation is then terminated.

Next, the real operation is started. The phase switching pulse number n and the current phase switching phase $\theta_0$ are initialized to be 1 and 0 deg., respectively, and the first phase switching pulse is output (step S3). The process continues such that an nth target phase switching phase $\theta$ is then obtained from the target phase switching phase table in RAM region 13 (step S4). Next, an nth target speed V is obtained from the target speed table in ROM region 11 (step S6), and the current real speed v is obtained from the output of the rotary encoder 3 (step S7).

The target phase switching phase $\theta$ which is obtained in step S4 from the target phase switching phase table is the original control target with respect to the rotor phase $\theta$ at a phase switching. Hereinafter, the phase is called "target phase switching phase for phase control." In the following description, in addition to the target phase switching phase $\theta$ for phase control, a target phase switching phase $\theta!$ for speed control which is used for making the actual speed v of the motor coincident with the target speed V, and a final target phase switching phase $\theta\$$ in which the two target phase switching phases $\theta$ and $\theta!$ are integrated with each other in accordance with the above-mentioned weighting will be discussed. Hereinafter, the former target phase switching phase $\theta!$ is called "target phase switching phase for speed control," and the latter target phase switching phase $\theta\$$ "integrated target phase switching phase."

On the basis of the current actual speed v, the current phase switching phase $\theta_0$, and the target speed V, the target phase switching phase for speed control $\theta!$ is calculated by expression (1) below (step S8)

$$\theta! = v/V - 90 + \theta_0 \quad (1)$$

In this equation, the units of the phase switching phases $\theta!$ and $\theta_0$ are degrees (electrical angle), the units of the actual speed v are degrees (electrical angle)/second, and the unit of the target speed V are pulses/second.

Hereinafter, the meaning of the right side of expression (1) will be described. In the expression, "1/V" means the period of the phase switching obtained when the motor is rotated at the target speed V, and "v/V" means an amount by which the phase $\theta$ is actually advanced at the current actual speed v during the phase switching period "1/V." The expression "$-90 + \theta_0$" means the phase $\theta$ immediately after the previous phase switching operation (e.g., conducted at the time of $\theta = \theta_0$) (in the 2-2-phase magnetization method, the phase 74 is shifted by $-90$ deg.). Consequently, the right side of expression (1) signifies the phase $\theta$ obtained when a time corresponding to the period "1/V" has elapsed after the previous phase switching operation. When the next phase switching operation is conducted at the time when the phase $\theta$ reaches the value of the right side, therefore, it means that the motor is disposed to be rotated at the next speed increment, eventually culminating at target speed V (see FIG. 3). Accordingly, the value of the right side indicates the target phase switching phase for speed control $\theta!$.

Next, the target phase switching phase for phase control $\theta$ and target phase switching phase for speed control $\theta!$ which are obtained as described above are integrated in accordance with expression (2) to obtain the integrated target phase switching phase $\theta S$ for the nth phase switching (step S9).

$$\theta\$ = (N-n)/N)\theta + (n/N)\theta! \quad (2)$$

where "(N−n)/N" and "n/N" are weighting factors for the target phase switching phase for phase control $\theta$ and target phase switching phase for speed control $\theta!$, respectively.

Figure 6:
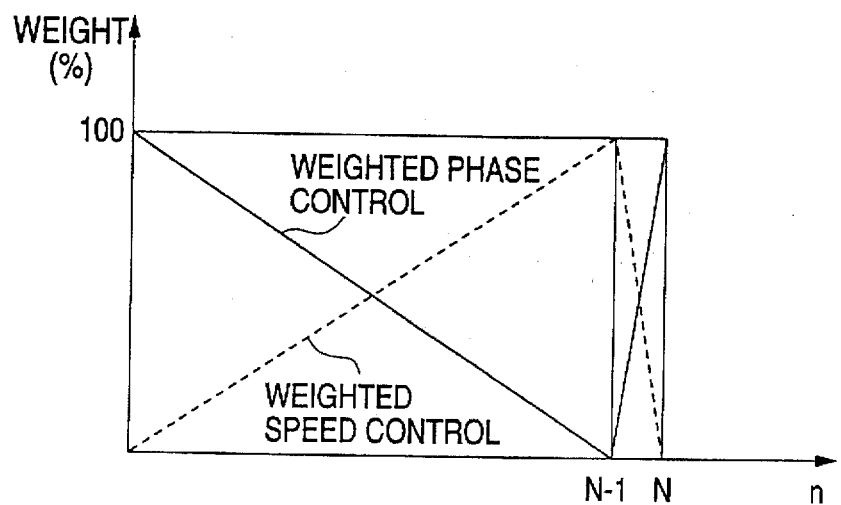
FIG. 6 is a diagram showing weighting of speed and phase controls according to an embodiment of the invention.

These weighting factors have the effect that, as shown in FIG. 6, the smaller n is (i.e., the earlier in the acceleration period), the larger is the weight of the phase control and the smaller that of the speed control. As n is increased (i.e., as the speed increases, the weight of the phase control is reduced while that of the speed control grows.

After the integrated target phase switching phase 85 for the nth phase switching is obtained as described above, when the actual phase $\theta$ coincides with the integrated target phase switching phase $\theta\$$ (step S10), the nth phase switching pulse is output and the phase switching is then conducted (step S11).

Thereafter, the phase switching pulse number n is incremented by one, and the nth integrated target phase switching phase $\theta\$$ is set as the current phase switching phase $\theta_0$ (step S13).

The steps S4 to S13 are repeated until n=N is attained. Repetition of steps S4–S13 causes the motor to be accelerated. As described above, in the early stage of acceleration, the weight of the phase control is relatively large. Consequently, a sufficiently large torque required for acceleration is generated and the phase at which the phase switching is conducted changes smoothly, with the result that the motor is accelerated smoothly and rapidly. As the acceleration increases, however, the speed control becomes larger and larger. At the final stage (n=N), therefore, it is possible to accurately fix the actual speed of the motor at the target speed V. for constant speed operation.

When the acceleration control reaches the final stage (n=N) (step S5), phase switching is conducted once more, in the following manner. At the time when the phase $\theta$ coincides with the target phase switching phase $\theta_N$ for phase control (step S14), the Nth phase switching is performed on the basis of only the phase $\theta_N$ (step S11). As a result, the phase of the phase switching in succeeding constant speed operation coincides with the target phase switching phase $\theta_N$ for constant speed operation. The coincidence cooperates with the above-described coincidence of the motor speed and the target speed $V_N$ for constant speed operation, to ensure the stability of the speed in succeeding constant speed operation (step S15). The result is that, unlike the prior art, dumping can be prevented from occurring.

Figure 7:
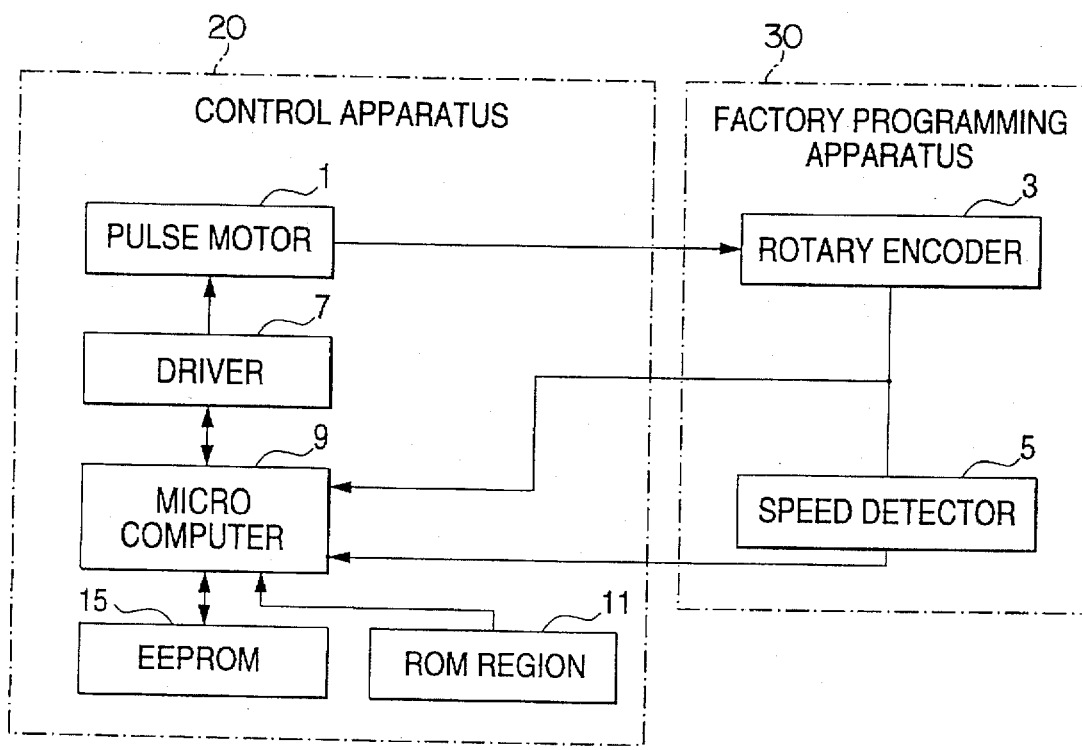
FIG. 7 is a block diagram showing the configuration of another embodiment of the invention.

FIG. 7 shows the configuration of another embodiment of the invention. In the embodiment, when a printer is to be shipped from the factory, a rotary encoder 3 and a speed detector 5, forming part of a programming apparatus 30 that is a tool in the factory, are connected to the control apparatus 20 of the printer. Then a preoperation is performed to prepare a target phase switching phase table, much like the one described in the first embodiment. The target phase switching phase table is stored in an EEPROM 15 of the printer. The tools in the factory are then disconnected from the printer, and the printer is shipped from the factory. In the printer, acceleration of a motor is conducted by open-loop control. Despite the above-described differences, this embodiment shares features with the first embodiment, described above, in that acceleration is controlled while integrating speed control with phase control and using a target speed table stored in the ROM region 11 and a target phase switching phase table.

Figure 8:
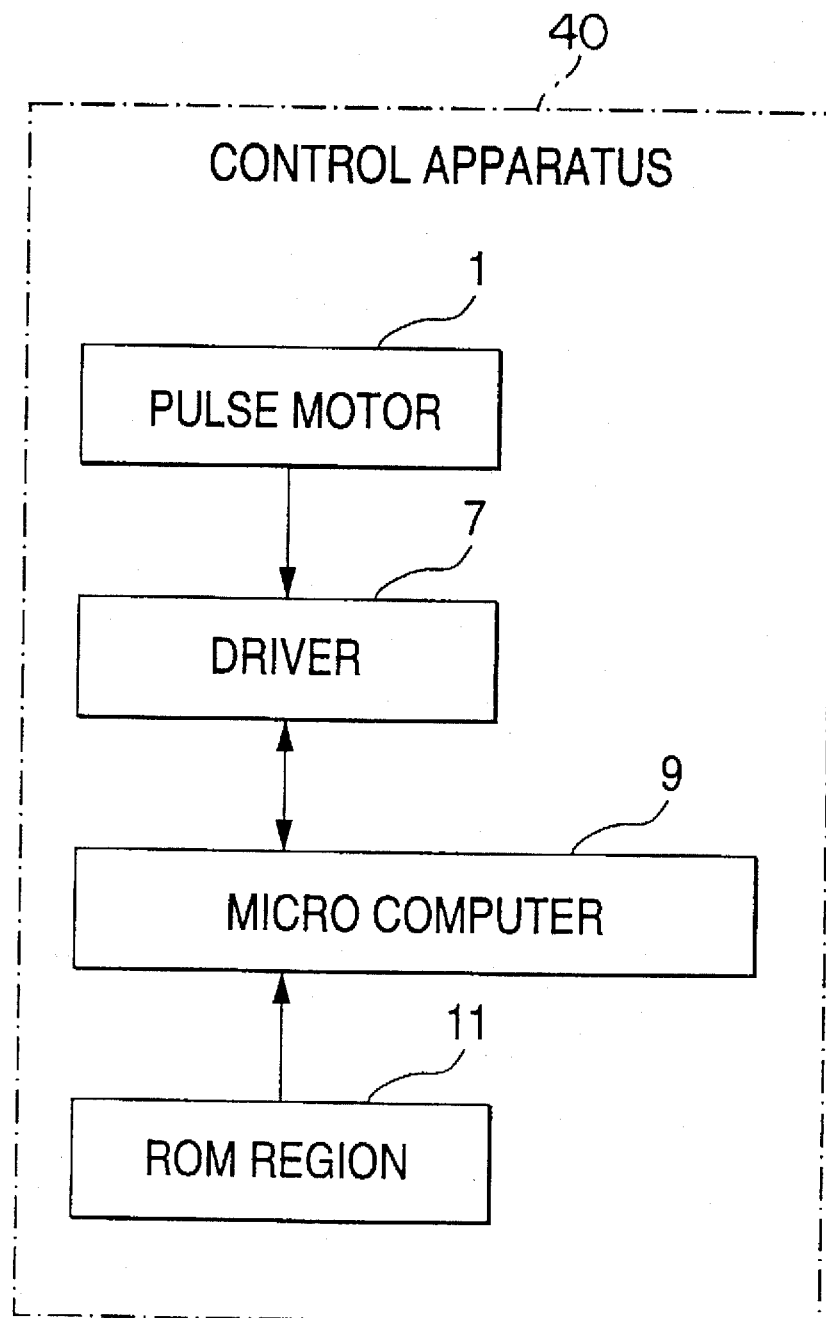
FIG. 8 is a block diagram showing the configuration of a further embodiment of the invention.

FIG. 8 shows the configuration of a further embodiment of the invention. In the embodiment, a target phase switching phase table, which is previously constructed in the design process, is stored in a ROM region 11 (along with a target speed table such as those described in the previous embodiments) of the control apparatus 40 of a printer. The target phase switching phase table is used for registering the integrated target phase switching phase described above. In the printer, acceleration of a motor is conducted by the open-loop control in accordance with the table. A target speed table is used in addition to a target phase switching phase table.

As seen from the above description, according to the first aspect of the invention, in a process wherein a pulse motor starts to run and then is accelerated to enter a constant speed operational state, dumping during constant speed operation can be reduced, so that a stable constant speed operating characteristic is realized.

According to the second aspect of the invention, in a process wherein a pulse motor starts to run and then is accelerated to enter a constant speed operational state, both a smooth acceleration characteristic and a stable constant speed operating characteristic can be achieved.

In the above description, several embodiments of the invention have been described as examples of the invention. From the disclosure provided, those skilled in the art will not only understand the present invention and its advantages, but will also find apparent various changes and modifications to the apparatus and methods disclosed as preferred embodiments. The Applicant, therefore, seeks to cover all such changes and modifications falling within the spirit and scope of the invention, as defined by the appended claims, as well as equivalents thereof.

What is claimed is:

1. A control apparatus for a pulse motor, comprising:
   acceleration controlling means for controlling said pulse motor to accelerate to a target speed at which a constant speed operation is attained; and
   phase adjusting means for adjusting, in a final stage of control conducted by said acceleration controlling means, a switching phase of said pulse motor to coincide with a target phase switching phase for the constant speed operation.

2. A control apparatus for a pulse motor according to claim 1, wherein:
   said acceleration controlling means comprises:
      means for generating a speed control operation amount during an acceleration period, in order to render an actual speed of said pulse motor coincident with a target speed upon conclusion of the acceleration period;
      means for generating a phase control operation amount during an acceleration period, in order to render the switching phase coincident with a target phase switching phase at a phase switching time upon conclusion of the acceleration period;
      means for integrating said speed control operation amount with said phase control operation amount in accordance with a predetermined weighting function, thereby obtaining an integrated operation amount for actually controlling said pulse motor,
      said weighting function being set so that, early in the acceleration period, said phase control operation amount is weighted more heavily, and, late in the acceleration period, said speed control operation amount is weighted more heavily; and
      means for controlling said pulse motor in accordance with said integrated operation amount.

3. A control apparatus for a pulse motor, comprising:
   means for generating a speed control operation amount during an acceleration period, in order to render an actual speed of said pulse motor coincident with a target speed upon conclusion of the acceleration period;
   means for generating a phase control operation amount during an acceleration period, in order to render the switching phase coincident with a target phase switching phase at a phase switching time upon conclusion of the acceleration period;
   means for integrating said speed control operation amount with said phase control operation amount in accordance with a predetermined weighting function, thereby obtaining an integrated operation amount for actually controlling said pulse motor,
   said weighting function being set so that, early in the acceleration period, said phase control operation amount is weighted more heavily, and, late in the acceleration period, said speed control operation amount is weighted more heavily; and
   means for controlling said pulse motor in accordance with said integrated operation amount.

4. A method, comprising the steps of:
   accelerating a pulse motor from an initial speed to a target speed; and
   once the pulse motor is operating at substantially the target speed, adjusting a phase of the pulse motor to substantially match a target phase.

5. A method for driving a pulse motor from a first operational state rapidly to a stable constant-speed operational state, said method accelerating the pulse motor during an acceleration period and comprising the steps of:
   during an early portion of the acceleration period, accelerating the pulse motor by, at least predominantly, controlling a phase of the pulse motor; and
   during a latter portion of the acceleration period, accelerating the pulse motor by, at least predominantly, controlling a speed of the pulse motor.

6. The method according to claim 5, further comprising the step of:
   following the latter portion of the acceleration period, driving the pulse motor by controlling the phase of the pulse motor exclusively.

7. The method according to claim 5, wherein the first operational state is a stationary state.

8. The method according to claim 5, wherein:
   during the early portion of the acceleration period, the phase of the pulse motor is controlled exclusively; and
   during the latter portion of the acceleration period, the speed of the pulse motor is controlled exclusively.

9. The method according to claim 5,
   wherein the acceleration of the pulse motor is controlled by a series of pulses, each of the pulses having at least one of a speed control component and a phase control component, throughout the acceleration period;
   wherein, for each of the pulses, the speed control component and the phase control component each contributes a minimum of 0% and a maximum of 100% to each of the pulses.

10. The method according to claim 9, wherein the phase control component stepwise decreases throughout the acceleration period, while the speed control component stepwise increases throughout the acceleration period.

11. The method according to claim 9, wherein the phase control component contibutes 100% to at least an initial pulse in the series of pulses, and the speed control component contributes 100% to at least a final pulse in the series of pulses.

12. The method according to claim 9, wherein the phase control component has an inverse relationship with the speed control component throughout the acceleration period.

* * * * *